Patented May 29, 1934

1,960,828

UNITED STATES PATENT OFFICE 1,960,828

PROCESS OF OBTAINING MINERAL OIL SULPHONATES

Warren T. Reddish and Latimer D. Myers, Cincinnati, Ohio, assignors to The Twitchell Process Company, Cincinnati, Ohio, a corporation of Ohio No Drawing. Application June 26, 1929, Serial No. 373,943

5 Claims. (Cl. 260—159)

Mineral oil sulphonic bodies constitute those products obtained as by-products of the fuming sulphuric acid or sulphur trioxide refining operations carried out in the production of technical and medicinal white oils.

Two distinct types of mineral oil sulphonic bodies are obtained as a result of these refining operations, the one type, the A layer mineral oil sulphonic bodies are predominantly oil soluble, the other type, the B layer mineral oil sulphonic bodies are predominantly water soluble. The B layer mineral oil sulphonic bodies are obtained, as disclosed in the Divine Patent No. 1,438,101, from the sludge which is drawn off after each acid treatment. The A layer mineral oil sulphonic bodies are obtained by extracting the residual oil, which has been treated repeatedly with fuming sulphuric acid, with water soluble organic solvents, specifically alcohols, as disclosed in the Petroff Patent No. 1,087,888, and the Humphries Patent No. 1,286,179.

The Petroff patent differs from the Humphries patent in that Petroff specifies the extraction of the A layer or oil soluble sulphonic bodies in the form of the sulphonic acids with subsequent neutralization and evaporation of the alcoholic solution, thus recovering the sulphonic bodies as the salts of the sulphonic acids, while the Humphries patent specifies the neutralization of the sulphonic acids prior to the alcohol treatment so that the sulphonic bodies are extracted as the salts of the sulphonic acids and are obtained as such by evaporation of the alcohol solution.

The general method of extracting oil soluble mineral oil sulphonic bodies as disclosed in the Petroff and Humphries patents is being used at the present time by the various producers of medicinal and technical white oils. However, since the above mentioned patents do not definitely specify either the concentration of water soluble organic solvent or the quantity of solvent most suitable for the purpose of extracting oil soluble sulphonic bodies, it is to be expected that the concentrations of the water soluble organic solvents used by the various producers shown considerable variation. Since the alcohol used in the extraction process must be evaporated in order to recover the oil soluble sulphonates and to permit the reuse of the alcohol for further extractions, it has been the custom to employ the least possible quantity of alcohol necessary for complete extraction. Although the use of a small quantity of alcohol under the proper conditions results in the complete extraction of the oil soluble mineral oil sulphonic bodies from the residual oil, the sulphonic bodies recovered in this manner hold colloidly, considerable quantities of oil.

As the result of having run a great number of analyses on commercial shipments of oil soluble mineral oil sulphonates extending over a period of years, we have found that the oil content of the oil soluble mineral oil sulphonates averages between 25 and 50%.

Patent No. 1,703,838 discloses a method of purification of oil soluble mineral oil sulphonic bodies whereby it is possible to obtain oil soluble mineral oil sulphonates practically free from mineral oil. We have also shown that the oil soluble mineral oil sulphonates purified in this manner are excellent emulsifying agents and superior fat splitting agents. They are practically new sulphonic bodies as regards their properties and can be used for purposes where the ordinary non-purified oil soluble mineral oil sulphonates have no application.

It is the purpose of this invention to provide a process whereby oil soluble mineral oil sulphonates possessing some properties similar to those exhibited by the oil soluble mineral oil sulphonates purified by the method disclosed in Patent No. 1,703,838 may be obtained directly in the manufacturing and refining operations by the use of a preferred method of extraction which we have developed.

The invention further discloses a process whereby the appreciable quantities of valuable white oil, which is lost by the present methods of extraction, can be economically recovered by the use of a preferred method of extraction.

We have investigated the effect of various variable factors involved in the use of water solutions of organic solvents as extracting agents, with respect to the oil content of the oil soluble sulphonates. As a result of having conducted an exhaustive number of experimental extractions we have found that there are three factors which have a considerable influence on the oil content of the oil soluble mineral oil sulphonates, namely, the quantity of solvent used in extracting the oil soluble suphonates; the concentration of the aqueous solution of the water soluble solvent and the degree of alkalinity or acidity of the extracting medium.

We have found that the greater the quantity of aqueous solution of water soluble organic solvent used in extracting the oil soluble sulphonates from a given quantity of oil, the lower is the oil content of the recovered sulphonates. This is true irrespective of the concentration of the aqueous solution of the water soluble organic solvent or the nature of the organic solvent.

Otherwise expressed, the greater the concentration of the oil soluble mineral oil sulphonate in the aqueous solution of water soluble solvent, the greater the oil content of the oil soluble sulphonate.

In investigating the effect of the concentration of the water solution of the water soluble organic solvents with special reference to alcohol solutions we have found that concentrations of between 65 and 70% by weight of alcohol are most effective while concentrations between 45% and 50% by weight of alcohol are very nearly as effective. It is therefore to be observed that a concentration of alcohol in water should approximate or exceed 50% by weight.

We have also investigated the relative merits of extracting in acid and alkaline media as regards the oil content of the recovered oil soluble sulphonates. We have conducted extractions in which the oil soluble mineral oil sulphonic bodies which are present in the sulphonated oil as the oil soluble mineral oil sulphonic acids, were neutralized, forming the salts of mineral oil sulphonic acids previous to extraction, in other words, the extractions were carried out in an alkaline medium. We have also carried out extractions in which the oil soluble mineral oil sulphonic bodies were extracted previous to neutralization, that is, the extractions were carried out in an acid medium. We have found that in every case the extractions carried out with the quantity and concentration of water soluble solvent above recommended in an acid medium produced oil soluble mineral oil sulphonates which were more oil free.

Having determined the optimum proportion concentration and acidity of water soluble organic solvent we are able to formulate a preferred method of extraction as follows:

Oil soluble mineral oil sulphonates relatively free from oil and possessing properties entirely different from those of the oil soluble mineral oil sulfonates, obtained by the ordinary methods of extraction, may be obtained by extracting, previous to neutralization with quantities of water soluble organic solvents, as exemplified by the alcohols, such that the concentration of the oil soluble mineral oil sulphonates in the solvent does not exceed 20% and furthermore that the concentration of the solvent to water be from 65 to 70% or from 45 to 50% by weight.

However, we prefer not to be limited to claims on definite concentrations of water soluble solvents as stated above in formulating our optimum extracting conditions but would rather be limited only by the results obtained as exemplified by the following quantitative test that will readily identify the products obtained by our process, namely, 10 parts by weight of the alkaline salts of the sulpho bodies so obtained when admixed with 90 parts by weight of a paraffine oil specific gravity .889, will form a stable emulsion when diluted with water to a concentration of ½% oil. No addition agents such as resin or fatty soap are required to obtain a permanent emulsion.

There are certain economic features attendant to the use of our preferred method of extraction. It is necessary to use a greater quantity of water soluble solvent but the increased yield of white oils obtained by obviating the entrainment or colloidal suspension of oil with the sulphonic bodies, will more than offset the added expense of evaporating a greater quantity of solvent.

Also, when extracting in an acid medium, especially with the preferred concentrations and quantities of solvent, the layer of emulsion which is often found between the oil and solvent layers when extracting on the alkaline side is entirely absent. Less alcohol is retained by the oil and the separations are more rapid when the extraction is carried out in an acid medium. The oil which is recovered is neutral and requires no further neutralization.

The oil free sulphonic bodies produced by the preferred method of extraction have more than a degree change in physical and chemical characteristics as evidenced by their behavior in water solution, (avoiding colloidal gels due to oil content), also by their marked emulsification properties as compared with the usual recovered sulpho bodies which require assisting agents such as rosin or fatty soaps to prepare stable emulsions. They possess a resin-like physical structure instead of a viscous oily character. The absence of oily stickiness makes possible their application to textile processes where the ordinary oil soluble sulphonic bodies are entirely unsuited.

The oil free sulphonic bodies described above as produced by the preferred method of extraction, are in no way similar to the so-called oil free sulphonates disclosed in the Divine Patent No. 1,493,111. These sulphonic bodies are "semi-pasty, similar in Phyrine characteristics to soft soap," while the products prepared as we have described, are hard and resin-like. Furthermore, our products comprise 100% of the oil soluble sulphonic bodies recoverable from sulphonated mineral oil while the products obtained by the method outlined in Patent No. 1,493,111 comprise only a certain selected portion of the oil soluble sulphonic bodies and whatever desirable properties they may possess are a result mainly of fractional separation of sulphonic bodies rather than oil separation.

Example

Lubricating stocks having gravities and viscosities suitable for the production of medicinal or technical white oils are treated, with mechanical or compressed air agitation, with from 5 to 10% (based on the weight of the oil) of fuming sulphuric acid. These treatments are continued until no further sludging takes place. The sludges are drawn off after each treatment. Technical oils usually require from 3 to 7 treatments and the medicinal white oils from 7 to 14 treatments.

After a definite number of treatments, 2 or 3, for instance, or after the last treatment, the oil containing the mineral oil sulphonic acids is treated with a 70% aqueous ethyl alcohol. An amount of aqueous alcohol is used approximately the equivalent to the weight of the oil being treated. The two are thoroughly mixed and then permitted to separate into layers or are run through a centrifuge. The remaining oil is cleared and contains no sulphonic acid, alcohol, or water. The aqueous alcohol contains all of the sulphonic acids and substantially no oil.

The alcohol solution of the sulphonic acids is then exactly neutralized and the aqueous alcohol is then distilled or evaporated from the sulphonate, leaving them as a remainder in a very pure state and possessed of the physical and chemical properties above set forth.

Where equipment is used which is not resistant to corrosion, the oil solution containing the sulphonic acids may be neutralized with sodium hydroxide, sodium carbonate or the like either before the alcohol solvent is added or the alkali may be incorporated in the alcoholic solvent. The results obtained by this neutralization before abstraction are not quite as good as the results obtained by deferring the neutralization, but are still far superior to the results obtained by the processes practiced commercially at present or any processes in which the volume of the solvent for the sulphonates is not proportioned to the volume of the oil and its sulphonic content to produce a solution without emulsifying tendencies.

Having described our invention, we desire to be limited only by the ensuing claims:

1. In the art of refining white petroleum by a sulphur trioxide process, the method of effecting a substantially complete separation of the sulphonated and unsulphonated components of the batch of petroleum after sulphonation in order to obtain a maximum yield of white oil and to recover all of the sulphonic bodies in relatively pure condition, said method comprising, extracting the sulphonic bodies from the petroleum with an organic solvent for the sulphonic bodies, said solvent in aqueous solution approximating or exceeding 50% by weight, the volume of aqueous solvent utilized being roughly equivalent by weight to the batch of sulphonated petroleum treated.

2. In the art of producing white petroleum by a sulphur trioxide process, the method of effecting a substantially complete separation of the sulphonated and unsulphonated components of the batch of petroleum after sulphonation in order to obtain a maximum yield of white oil and to recover all of the sulphonic bodies in relatively pure condition, said method comprising extracting the sulphonic bodies from the petroleum with an aqueous solution of organic solvent for the sulphonic bodies the concentration of the solvent in aqueous solution approximating or exceeding 50% by weight, the quantity of aqueous solvent used being so related to the sulphonic content of the batch of petroleum that the concentration of sulphonic bodies in aqueous solvent is less than 20% by weight.

3. A new composition of matter, consisting of all of the oil soluble petroleum sulphonic bodies produced by a sulphur trioxide treatment of petroleum in the white oil refining art, said composition being so free from oil as to be hard and resin-like in character.

4. In the art of refining white petroleum by a sulphur trioxide process, the method of effecting a substantially complete separation of the sulphonated and unsulphonated components of a batch of petroleum after sulphonation in order to obtain a maximum yield of white oil and to recover all of the sulphonic bodies in a relatively pure condition, said method comprising, extracting the sulphonic bodies from the petroleum with an organic solvent for the sulphonic bodies, said solvent in a 45-50% (by weight) aqueous solution, the quantity of aqueous solvent used being so related to the sulphonic content of the batch of petroleum that the concentration of sulphonic bodies in aqueous solvent is below 20% by weight.

5. In the art of refining white petroleum by a sulphur trioxide process, the method of effecting a substantially complete separation of the sulphonated and unsulphonated components to a batch of petroleum after sulphonation in order to obtain a maximum yield of white oil and to recover all of the sulphonic bodies in relatively pure condition, said method comprising extracting the sulphonic bodies from the petroleum with an organic solvent for the sulphonic bodies, said solvent in a 65-70% (by weight) aqueous solution, the quantity of aqueous solvent used being so related to the sulphonic content of the batch of petroleum that the concentration of sulphonic bodies in aqueous solvent is less than 20% by weight.

WARREN T. REDDISH.
LATIMER D. MYERS.